United States Patent [19]

Vaillancourt et al.

[11] Patent Number: 5,568,781
[45] Date of Patent: Oct. 29, 1996

[54] INDUCED FLOW UNDERSEA VEHICLE MOTOR COOLING JACKET

[75] Inventors: John J. Vaillancourt, Tiverton; James E. Mulherin, Portsmouth, both of R.I.

[73] Assignee: The United States of America as represented by the Secretary of the Navy, Washington, D.C.

[21] Appl. No.: 394,082

[22] Filed: Feb. 17, 1995

[51] Int. Cl.⁶ .................................................. F02G 3/02
[52] U.S. Cl. ........................ 114/20.2; 60/912; 114/337
[58] Field of Search ............................. 114/20.2, 20.1, 114/338, 337, 312; 60/912, 266, 267; 440/88

[56] References Cited

U.S. PATENT DOCUMENTS

| | | | |
|---|---|---|---|
| 1,315,352 | 9/1919 | Torazzi | 114/20.1 |
| 2,990,797 | 7/1961 | Moeller | 114/338 |
| 3,016,693 | 1/1962 | Jack et al. | 60/268 |
| 3,069,850 | 5/1962 | Ledwith et al. | 60/268 |
| 3,135,353 | 5/1964 | Pederson et al. | 114/337 |
| 3,177,935 | 4/1965 | Rosman | 165/169 |
| 3,190,070 | 6/1965 | Neu, Jr. | 60/268 |
| 3,533,467 | 10/1970 | Rummel | 165/163 |
| 3,692,637 | 9/1972 | Dederra et al. | 60/268 |
| 3,713,293 | 1/1973 | Simon | 60/267 |
| 3,849,983 | 9/1974 | Cherry | 60/255 |
| 3,964,416 | 6/1976 | Kiraly et al. | 114/20.2 |
| 4,069,788 | 1/1978 | Nitzki | 115/76 |
| 4,424,042 | 1/1984 | Gongwer | 440/44 |
| 4,680,934 | 7/1987 | Short | 60/652 |
| 4,756,264 | 7/1988 | Ewbank | 114/20.1 |
| 4,767,366 | 8/1988 | Lang | 440/76 |
| 5,285,633 | 2/1994 | Duva | 60/39.63 |

Primary Examiner—Michael J. Carone
Assistant Examiner—Christopher K. Montgomery
Attorney, Agent, or Firm—Michael J. McGowan; James M. Kasischke; Prithvi C. Lall

[57] ABSTRACT

An induced flow underwater vehicle motor cooling jacket adaptable to an underwater vehicle motor is provided. The cooling jacket has a self-priming inlet incorporated into the afterbody motor shell section which ingests seawater during either vehicle movement through the water or operation of the vehicle motor. The motor cooling jacket has a coiled tubing assembly, forming a heat exchanger with a variable tube cross-section, wrapped tightly around the motor. One end of the tubing is attached to the self-priming inlet and the coolant discharge nozzle at the opposite end of the tubing exhausts to the region immediately ahead of the vehicle propeller. Solder is applied between each coil to maintain strength and the tightly wrapped configuration of the cooling jacket.

14 Claims, 4 Drawing Sheets

1

INDUCED FLOW UNDERSEA VEHICLE MOTOR COOLING JACKET

STATEMENT OF GOVERNMENT INTEREST

The invention described herein may be manufactured and used by or for the Government of the United States of America for Governmental purposes without the payment of any royalties thereon or therefor.

BACKGROUND OF THE INVENTION

1. Technical Field of the Invention

The invention is related to undersea vehicle motor cooling mechanisms and more particularly to self-powered cooling systems.

2. Description of the Prior Art

There are numerous devices for cooling systems for undersea vehicle motors in the prior art. An undersea vehicle can be any type of small autonomous undersea craft such as a torpedo. Typically, these devices have provided liquid cooling, sometimes with phase change, to housing or motor assemblies. Representative patents include U.S. Pat. No. 3,964,416 to Kiraly et al. and U.S. Pat. No. 4,680,934 to Short. Technical difficulties involved in undersea vehicle cooling systems include the necessity to produce a wake having low observables thereby avoiding easy detection. To reduce observables, the cooling system should avoid discharges having high temperature gradients, having high gas or steam concentrations, and having high turbulence levels. Additionally, the cooling system itself should not produce additional noise caused by pumps or other mechanisms. Finally, a cooling system for a torpedo must operate over a range of depths and pressures. In current designs, some torpedoes depend on limited heat transfer to the ocean water along with short mission duration to permit short-term operation without a sufficient amount of cooling to allow extended steady state operation. This lack of sufficient cooling prevents the use of torpedo components for new and emerging technologies, such as remotely operated or autonomous underwater vehicles. Also, the limited heat transfer presents a cooling problem during out-of-water testing or even during extended in-water testing.

SUMMARY OF THE INVENTION

Accordingly, it is an object of the invention to provide a cooling jacket for an underwater vehicle motor having a silent, self-pumping operation.

It is another object of the invention to provide a cooling jacket which discharges cooling water in a liquid state and which produces a reduced temperature signature.

It is yet another object of the invention to provide a cooling jacket suitable for extended operation of an unmapped undersea vehicle.

It is a further object to provide a cooling jacket suitable for use at any depth and pressure and further adaptable for use in out-of-water testing environments.

The invention is an induced flow cooling jacket for an undersea vehicle motor comprising a self-priming inlet, open to seawater, and attached to a heat exchanger assembly. The heat exchanger assembly is fabricated from conductive tubing wound around the vehicle motor. The discharge of the cooling system water is located immediately ahead of the vehicle propeller in an area of reduced pressure. The rotation of the vehicle propeller causes a pumping action in the cooling system drawing water through the system. The mixing action of the propeller distributes the heated water from the cooling system throughout the propeller wake. The vehicle is also cooled by the ram flow effect while the vehicle is running and additionally can be cooled during dry testing by attaching a water source to the cooling system inlet.

BRIEF DESCRIPTION OF THE DRAWINGS

The foregoing objects and other advantages of the present invention will be more fully understood from the following detailed description and reference to the appended drawings wherein.

DESCRIPTION OF THE PREFERRED EMBODIMENTS

Figure 1:
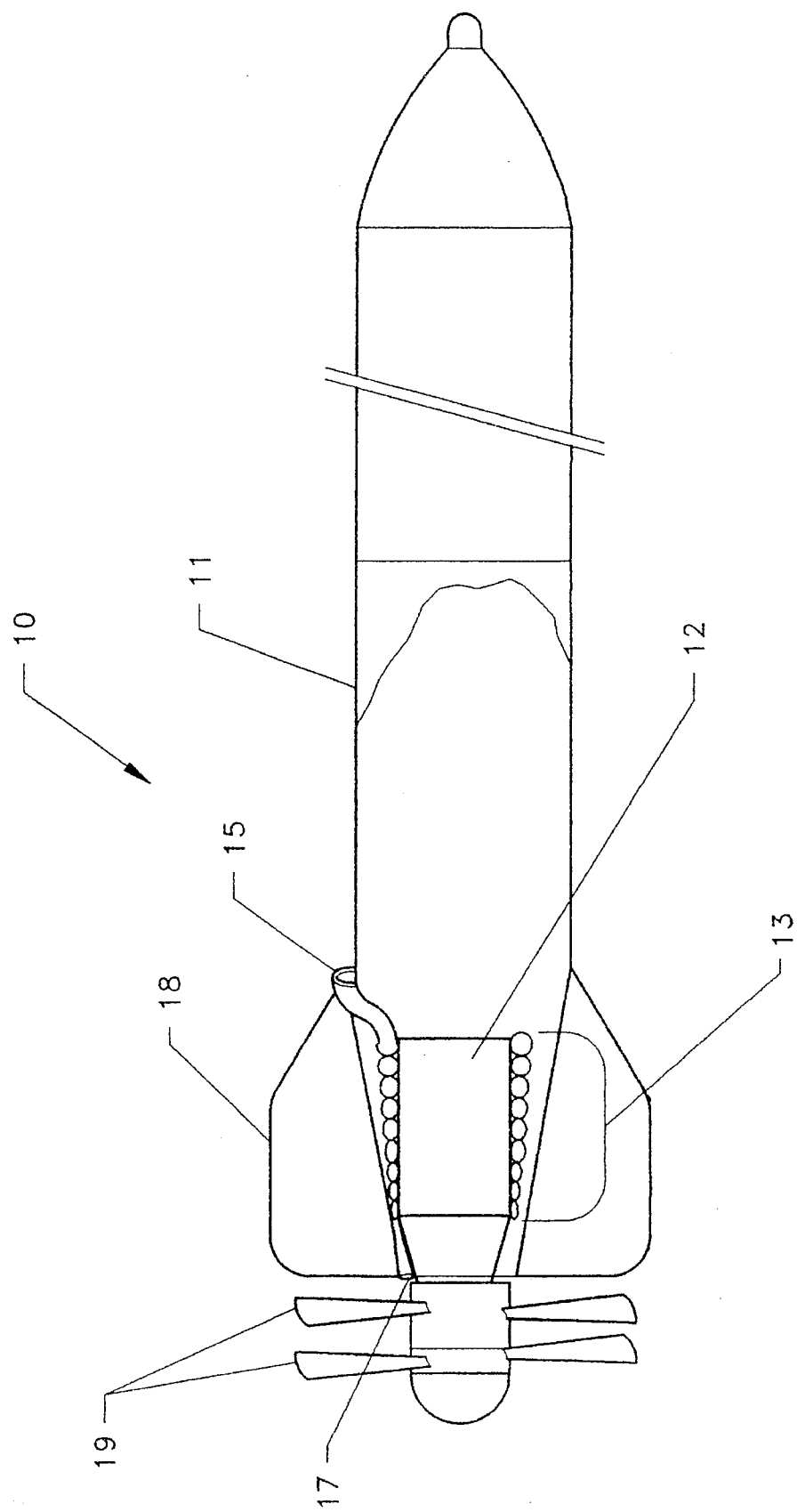
FIG. 1 is a cross-sectional side view of the cooling jacket as installed on an unmanned undersea vehicle.

Referring now to FIG. 1, the induced flow cooling jacket of the present invention, designated generally by the reference numeral 10, is shown with its major components. The cooling jacket is installed in an underwater vehicle 11 and has a winding 13 of heat conductive tubing, (in the preferred embodiment, copper tubing is used) wound around an electric motor 12. A self-priming inlet 15 attached to the afterbody surface of the vehicle provides a ram pressure driven pickup for seawater during normal vehicle operation. A discharge nozzle or port 17 is provided on the rearward edge of a fin 18. Discharge port 17 can be equipped with a divergent diffuser to improve mixing with environmental water. The position of discharge port 17 directs the discharged coolant directly into a propeller 19. The discharge port 17 location, just forward of the propeller 19, is in a region of reduced pressure due to the action of the propeller 19. The combined effect of ram pressure at inlet 15 and the reduced pressure at the discharge port 17, creates a self-pumping action in the cooling jacket. Additionally, the discharge of hot coolant into the propeller 19 disk, along with the divergent-shaped diffuser, results in a mixing of the coolant with the surrounding seawater. This mixing significantly reduces the temperature gradients in the discharge region and results in a significant reduction in the temperature signature of the vehicle.

Figure 2:
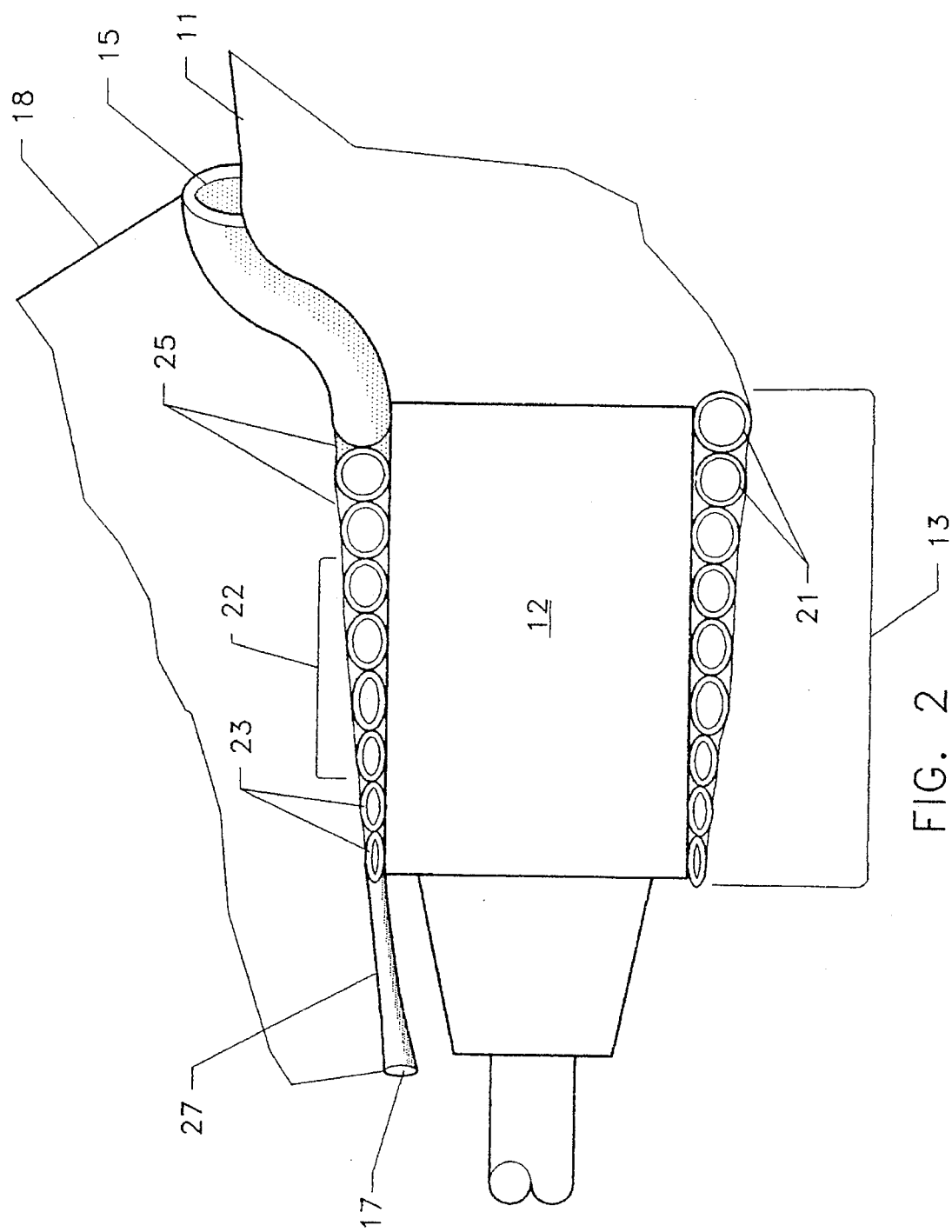
FIG. 2 is a partial side view in cross-section showing the configuration of the heat exchanger tubes.

The detailed configuration of the cooling jacket 10 can be seen in FIG. 2. Portions of the hull of vehicle 11 and fin 18 are shown for reference. Inlet 15 is located at the base of fin 18 on the afterbody motor shell section providing a self-priming seawater inlet. The ram pressure generated by movement of the vehicle creates sufficient water flow to cool motor 12. The inlet 15 provides coolant to the initial windings 21 of the cooling windings 13.

In cooling the motor 12, the initial windings 21 and rearmost windings 23 surround relatively cooler parts of the motor 12 while the middle windings 22 surround a hotter section of the electric motor 12. In order to increase the available heat transfer surface in the hottest section, additional contact surface area should be provided between the motor and the tubing. It is also desirable to increase the velocity of flow in the hot section so as to provide additional turbulent mixing of the coolant. In order to achieve these results, it is necessary to have a slightly smaller cross-sectional area in this section than in the initial windings. The variation in cross-sectional area shown in FIGS. 1 and 2 exaggerated for clarity. In this manner, the heat transfer is initially lower and then increases due to both more contact surface and better coolant velocity and mixing within the heat exchanger. To achieve these characteristics, the cooling jacket, in the preferred embodiment, is fabricated with a varying tension during winding of the cooling tubes. The initial windings 21 are wound snug to motor 12 but not so tightly as to deform the circular cross-section. As the windings progress, the winding is pulled more tightly causing a deformation or flattening of the tubing to a slightly elliptical shape at the middle windings 22. As the windings continue, the tubing is pulled more tightly, causing a flattened oval cross-section of the tubing at the rearmost windings 23. After winding the coolant tubing, solder 25 is applied to fill the gaps between tubes and the motor shell, thereby adding rigidity and improving heat transfer between the motor 12 and the cooling jacket 10. Discharge port 17 is shown as provided with a divergent diffuser 27. Divergent diffuser 27 is a nozzle having an inlet with the same diameter as the tubing outlet. The outlet of diffuser 27 has a larger diameter to promote mixing with environmental water.

Figure 3:
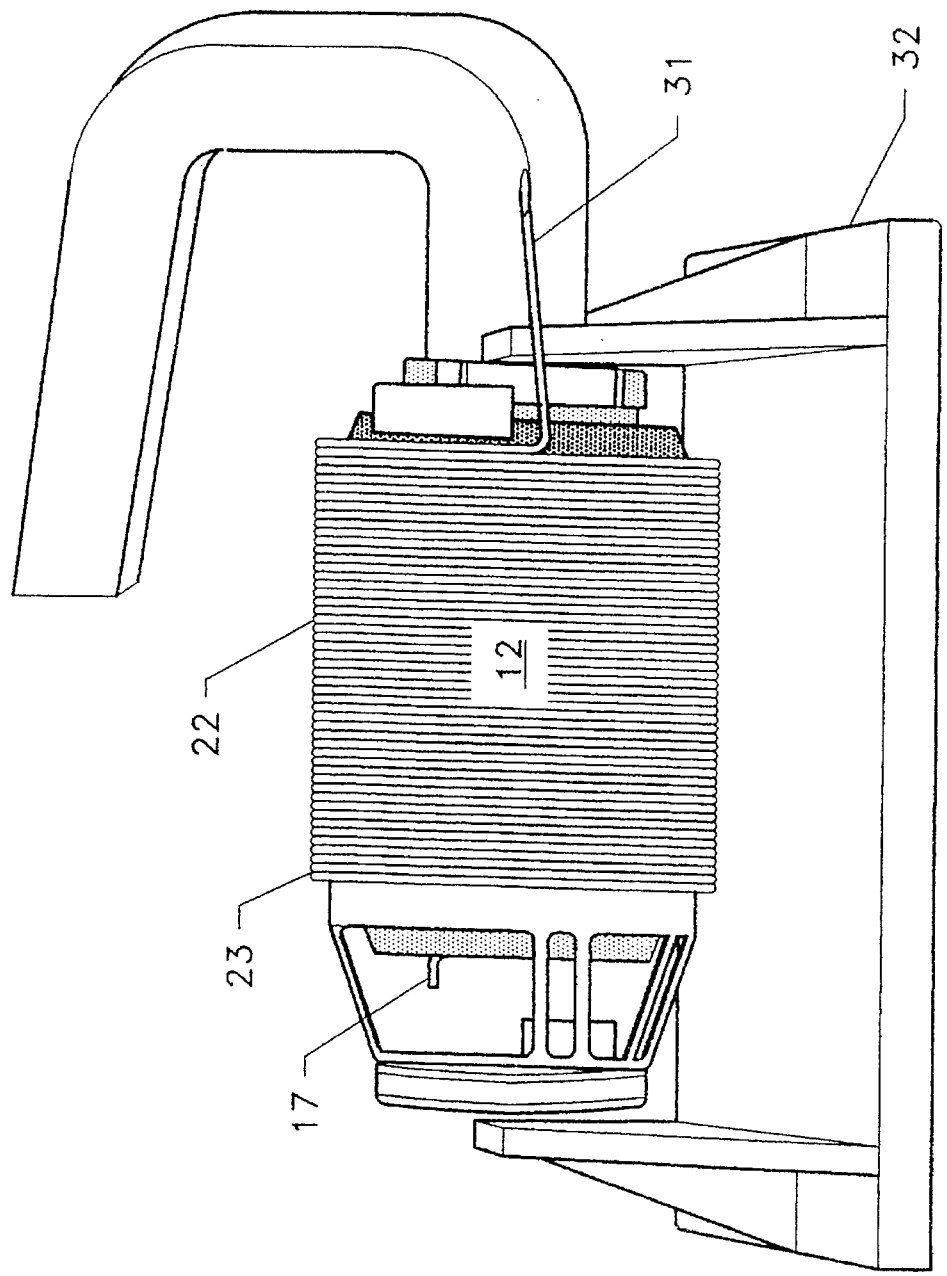
FIG. 3 is a side view of the cooling jacket installed on a vehicle motor.

FIG. 3 shows a MK-45 torpedo motor 12 on a dry test stand 32. The cooling jacket 10 of this invention permits out-of-water testing in several configurations by supplying cooling water to the inlet tube 31. The torpedo may be tested either assembled or disassembled, the only requirement being that cooling water be supplied to the jacket. The location of the more tightly wound tubing, the middle winding 22 and rearmost windings 23, are shown for reference. A portion of the diffuser exhaust or discharge port 17 is shown as well.

Figure 4:
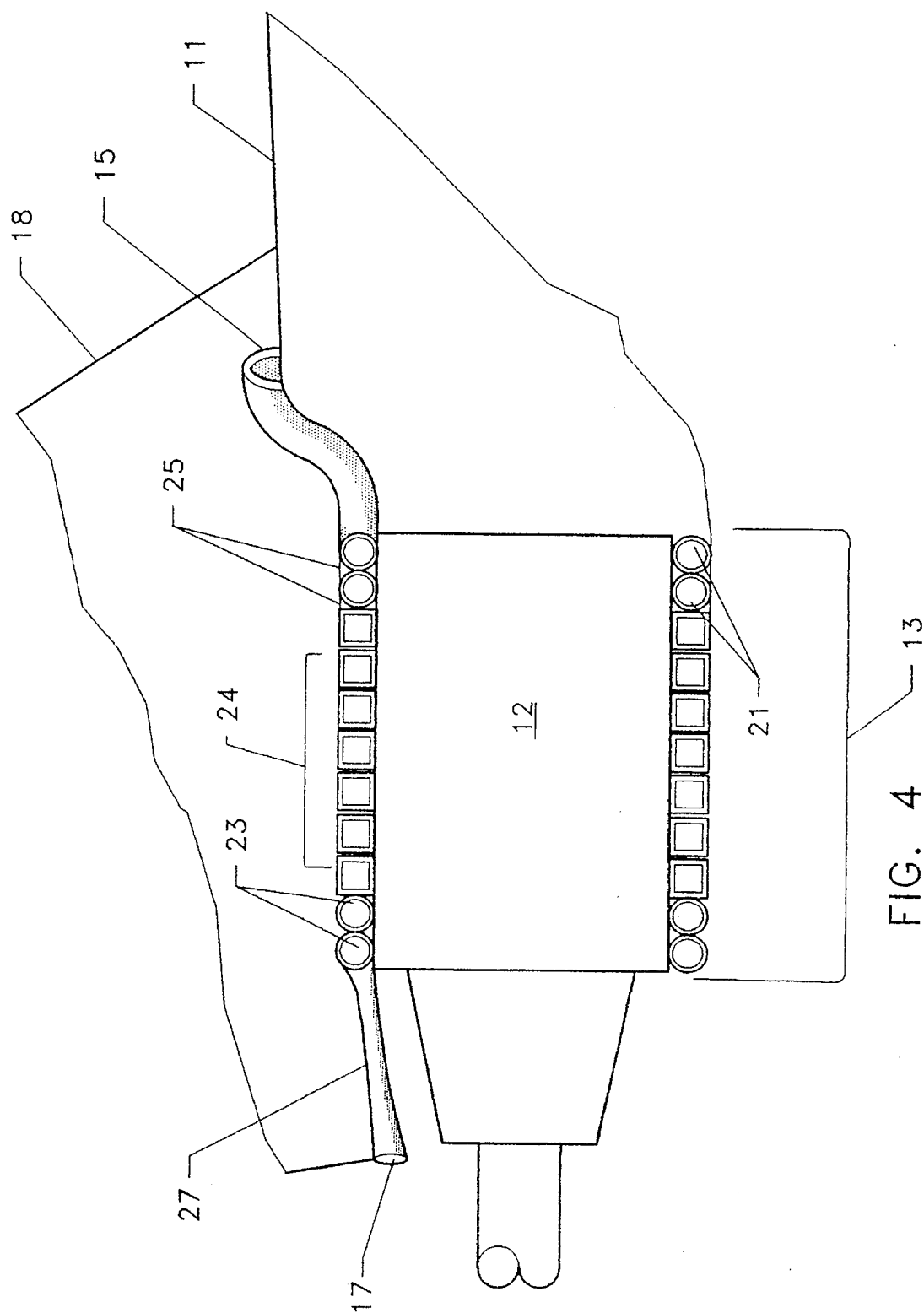
FIG. 4 is a partial side view in cross-section showing the configuration of an alternate embodiment of the heat exchanger tubes.

In FIG. 4, there is shown an alternate embodiment of the current invention. In this embodiment, middle windings 24 are provided having square cross-sections. The cross-sectional area of these windings is less than that provided by initial windings 21. Rearmost windings 23 can also have a circular cross-section because they are positioned around a cooler area of engine 12.

The features and advantage of the invention are numerous. The self-priming and self-pumping cooling system of the present invention provides cooling without additional mechanical aid or noise. As a result, the acoustic signature of the vehicle does not increase. Additionally, the diffusion and injection of heated coolant into the propeller disk mixes the discharged coolant, thereby avoiding any temperature gradients which might produce a temperature signature. Additionally, the shaping of the wrapped tubing, from circular to elliptical or square in cross-section, improves the heat transfer while maintaining unrestricted flow.

It will be understood that many additional changes in the details, materials, steps and arrangement of parts, which have been herein described and illustrated in order to explain the nature of the invention, may be made by those skilled in the art within the principle and scope of the invention as expressed in the appended claims.

What is claimed is:

1. An induced flow motor cooling jacket for a propeller-driven underwater vehicle comprising:

a self-priming inlet;

a heat exchanger comprising heat conductive tubing having a cross-section shaped to provide an increasing heat transfer coefficient as said tubing extends through the heat exchanger, wherein said tubing is wound around and in physical contact with a vehicle motor and connected to said self-priming inlet; and a coolant discharge nozzle attached to said heat exchanger and located in a region in front of said vehicle propeller.

2. An induced flow motor cooling jacket as in claim 1 wherein said heat conductive tubing comprises copper tubing.

3. An induced flow motor cooling jacket as in claim 1 wherein said coolant discharge nozzle is a divergent diffuser.

4. An induced flow motor cooling jacket as in claim 1 wherein said conductive tubing has a cross-section initially circular, and changing to elliptical in a middle section of said heat exchanger.

5. An induced flow motor cooling jacket for an underwater vehicle having a motor and a propeller, comprising:

a self-priming inlet exposed to high pressure environmental water outside said vehicle;

means for cooling positioned in contact with a motor of said underwater vehicle, said means for cooling having an input and an output, said input being joined to said self-priming inlet to provide water to said input, said means for cooling comprising heat conductive tubing having a cross section shaped to provide an increasing heat transfer coefficient as said water travels through said means for cooling from said input to said output; and a coolant discharge nozzle attached to said means for cooling output, said coolant discharge nozzle being exposed to low pressure environmental water outside said vehicle.

6. The induced flow motor cooling jacket of claim 5 wherein said means for cooling comprises a heat conductive tubing wrapped in turns around said underwater vehicle motor.

7. The induced flow motor cooling jacket of claim 5 wherein said heat conductive tubing has an initial section with said tubing having a circular cross-section and a middle section with said tubing having a flattened elliptical cross-section smaller in area than that of said initial section.

8. The induced flow motor cooling jacket of claim 7 wherein said heat conductive tubing has a rearmost section with said tubing having a circular cross-section.

9. The induced flow motor cooling jacket of claim 8 wherein said heat conductive tubing is made from copper.

10. The induced flow motor cooling jacket of claim 5 wherein said heat conductive tubing has an initial section with said tubing having a circular cross-section and a middle section with said tubing having a substantially square cross-section smaller in area than that of said initial section.

11. The induced flow motor cooling jacket of claim 10 wherein said heat conductive tubing has a rearmost section with said tubing having a circular cross-section.

12. The induced flow motor cooling jacket of claim 11 wherein said heat conductive tubing is made from copper.

13. The induced flow motor cooling jacket of claim 5 wherein said coolant discharge nozzle is positioned in front of a propeller of said underwater vehicle.

14. The induced flow motor cooling jacket of claim 13 wherein said coolant discharge nozzle is a divergent diffuser.

* * * * *